(12) United States Patent
Kim et al.

(10) Patent No.: US 10,410,061 B2
(45) Date of Patent: Sep. 10, 2019

(54) IMAGE CAPTURING APPARATUS AND METHOD OF OPERATING THE SAME

(71) Applicant: SAMSUNG ELECTRONICS CO., LTD., Suwon-si, Gyeonggi-do (KR)

(72) Inventors: Il-do Kim, Suwon-si (KR); Woo-seok Choi, Suwon-si (KR)

(73) Assignee: SAMSUNG ELECTRONICS CO., LTD., Suwon-si, Gyeonggi-do (KR)

( * ) Notice: Subject to any disclaimer, the term of this patent is extended or adjusted under 35 U.S.C. 154(b) by 218 days.

(21) Appl. No.: 14/983,706

(22) Filed: Dec. 30, 2015

(65) Prior Publication Data

US 2017/0011525 A1    Jan. 12, 2017

(30) Foreign Application Priority Data

Jul. 7, 2015  (KR) .......................... 10-2015-0096780

(51) Int. Cl.
  *H04N 5/225*  (2006.01)
  *G06K 9/00*  (2006.01)
  *G06K 9/32*  (2006.01)
  *H04N 5/232*  (2006.01)

(52) U.S. Cl.
  CPC ....... *G06K 9/00771* (2013.01); *G06K 9/3233* (2013.01); *H04N 5/2258* (2013.01); *H04N 5/23219* (2013.01); *H04N 5/23222* (2013.01); *H04N 5/23212* (2013.01)

(58) Field of Classification Search
  CPC .... G06K 9/00771; G06K 9/3233; G06T 7/11; G06T 7/571; H04N 5/23212; H04N 5/247
  See application file for complete search history.

(56) References Cited

U.S. PATENT DOCUMENTS

| 9,609,305 | B1* | 3/2017 | Ramaswamy | ..... H04N 13/0246 |
| 2011/0149044 | A1 | 6/2011 | Snin | |
| 2011/0169921 | A1* | 7/2011 | Lee | ..................... H04N 5/23212 |
| | | | | 348/46 |
| 2011/0221869 | A1* | 9/2011 | Yamaya | ............. H04N 13/0239 |
| | | | | 348/47 |

(Continued)

FOREIGN PATENT DOCUMENTS

| KR | 10-2011-0071217 | 6/2011 |
| KR | 10-2012-0043995 | 5/2012 |

(Continued)

OTHER PUBLICATIONS

Search Report and Written Opinion dated Apr. 7, 2016 in counterpart International Patent Application No. PCT/KR2015/014427.

(Continued)

*Primary Examiner* — Christopher G Findley
(74) *Attorney, Agent, or Firm* — Nixon & Vanderhye, P.C.

(57) ABSTRACT

An image capturing apparatus includes: a first camera module and a second camera module having different optical characteristics and configured to capture a same subject; and a controller configured to set a region including the subject as a first region of interest (ROI) in a first image captured by the first camera module and to detect a second ROI matching the first ROI in a second image captured by the second camera module, based on a difference in optical characteristics of the first camera module and optical characteristics of the second camera module.

17 Claims, 14 Drawing Sheets

(56) References Cited

U.S. PATENT DOCUMENTS

| | | | |
|---|---|---|---|
| 2012/0327195 A1* | 12/2012 | Cheng | H04N 5/23212 |
| | | | 348/47 |
| 2013/0100311 A1 | 4/2013 | Ogasahara | |
| 2013/0120538 A1 | 5/2013 | Shin et al. | |
| 2013/0250067 A1* | 9/2013 | Laxhuber | H04N 13/0239 |
| | | | 348/47 |
| 2014/0071245 A1 | 3/2014 | Zhang et al. | |
| 2014/0104376 A1 | 4/2014 | Chen | |
| 2015/0015741 A1 | 1/2015 | Kim et al. | |
| 2015/0092066 A1* | 4/2015 | Geiss | H04N 5/2258 |
| | | | 348/180 |
| 2015/0104074 A1* | 4/2015 | Vondran, Jr. | H04N 13/133 |
| | | | 382/106 |
| 2016/0182821 A1* | 6/2016 | Shabtay | H04N 5/2258 |
| | | | 348/239 |
| 2017/0111630 A1* | 4/2017 | Geiss | H04N 5/23212 |

FOREIGN PATENT DOCUMENTS

| | | |
|---|---|---|
| KR | 10-2013-0051709 | 5/2013 |
| KR | 10-2015-0007799 | 1/2015 |
| WO | 2012/140919 | 10/2012 |

OTHER PUBLICATIONS

Extended Search Report dated Apr. 17, 2018 in counterpart European Patent Application No. 15897818.9.
Anonymous: "Angle of view", Wikipedia, May 2, 2015, 6 pages, XP055462996.

* cited by examiner

IMAGE CAPTURING APPARATUS AND METHOD OF OPERATING THE SAME

CROSS-REFERENCE TO RELATED APPLICATION

This application is based on and claims priority under 35 U.S.C. § 119 to Korean Patent Application No. 10-2015-0096780, filed on Jul. 7, 2015, in the Korean Intellectual Property Office, the disclosure of which is incorporated by reference herein in its entirety.

BACKGROUND

1. Field

The disclosure relates to image capturing apparatuses and methods of operating the same, and for example, to image capturing apparatuses that match regions of interest (ROIs) including the same subject in images captured by a plurality of camera modules having different optical characteristics, and methods of operating the image capturing apparatuses.

2. Description of Related Art

A multiple camera system may include two or more camera modules and may detect a focus on a specific subject or detect depth information of an entire image by using images input from the two or more camera modules. In particular, in order to detect a location of a specific subject, the multiple camera system may calculate a disparity between two images input from two cameras installed on left and right sides of the multiple camera system. For example, the multiple camera system may detect a location where a subject captured at a specific location of one image is captured in the other image, and detect a difference (disparity) between the two locations, i.e., a difference between the two locations. The multiple camera system may use the detected disparity to detect a focus on a specific subject or calculate a distance value from each of two cameras to the specific subject.

SUMMARY

Image capturing apparatuses capable of detecting regions including the same subject from a plurality of images captured by a plurality of camera modules having different optical characteristics, and methods of operating the image capturing apparatuses are provided.

Additional aspects will be set forth in part in the description which follows and, in part, will be apparent from the following description.

According to an aspect of an example embodiment, an image capturing apparatus includes: a first camera module including a first camera and a second camera module including a second camera, each camera module having different optical characteristics and configured to capture images of a same subject; and a controller configured to set a region including the subject as a first region of interest (ROI) in a first image captured by the first camera module and to detect a second ROI matching the first ROI in a second image captured by the second camera module, based on a difference between optical characteristics of the first camera module and optical characteristics of the second camera module.

The optical characteristics of the first camera module may be determined based on at least one of an angle of view of a lens included in the first camera module and a resolution of an image sensor included in the first camera module, and the optical characteristics of the second camera module may be determined based on at least one of an angle of view of a lens included in the second camera module and a resolution of an image sensor included in the second camera module.

The controller may be configured to determine a size of the second ROI based on a size of the first ROI and a difference between the angle of view of the lens included in the first camera module and the angle of view of the lens included in the second camera module.

When the angle of view of the lens included in the first camera module is wider than the angle of view of the lens included in the second camera module, the controller may be configured to determine the size of the second ROI to be larger than the size of the first ROI.

The controller may be configured to determine a number of pixels included in the second ROI based on a number of pixels included in the first ROI and a difference between the resolution of the image sensor included in the first camera module and the resolution of the image sensor included in the second camera module.

When the resolution of the image sensor included in the first camera module is higher than the resolution of the image sensor included in the second camera module, the controller may be configured to determine the number of the pixels included in the second ROI to be smaller than the number of the pixels included in the first ROI.

The controller may be configured to adjust focuses of the lenses included in the first camera module and the second camera module based on disparity information of the first ROI and the second ROI.

The controller may be configured to detect depth information of one of the first ROI and the second ROI based on disparity information of the first ROI and the second ROI.

When a region of the first image, in which a second subject that is not included in the second image is included, is set as the first ROI, the controller may be configured to adjust a focus of a lens included in the first camera module using only the first ROI including the second subject.

According to an aspect of another example embodiment, a method of operating an image capturing apparatus includes: acquiring a first image by capturing a subject using a first camera module; acquiring a second image by capturing the subject using a second camera module, the second camera module having different optical characteristics from the first camera module; setting a first region of interest (ROI) including the subject in the first image; and detecting a second ROI matching the first ROI in the second image based on a difference between optical characteristics of the first camera module and optical characteristics of the second camera module.

The optical characteristics of the first camera module may be determined based on at least one of an angle of view of a lens included in the first camera module and a resolution of an image sensor included in the first camera module, and the optical characteristics of the second camera module may be determined based on at least one of an angle of view of a lens included in the second camera module and a resolution of an image sensor included in the second camera module.

Detecting the second ROI may include determining a size of the second ROI based on a size of the first ROI and a difference between the angle of view of the lens included in the first camera module and the angle of view of the lens included in the second camera module.

When the angle of view of the lens included in the first camera module is wider than the angle of view of the lens included in the second camera module, determining the size of the second ROI may include determining the size of the second ROI to be larger than the size of the first ROI.

Detecting the second ROI may include determining a number of pixels included in the second ROI based on a number of pixels included in the first ROI and a difference between the resolution of the image sensor included in the first camera module and the resolution of the image sensor included in the second camera module.

When the resolution of the image sensor included in the first camera module is higher than the resolution of the image sensor included in the second camera module, determining the number of the pixels included in the second ROI may include determining the number of the pixels included in the second ROI to be smaller than the number of the pixels included in the first ROI.

The method may further include adjusting focuses of lenses included in the first camera module and the second camera module based on disparity information of the first ROI and the second ROI.

The method may further include detecting depth information of one of the first ROI and the second ROI based on disparity information of the first ROI and the second ROI.

The method may further include: setting a region of the first image, in which a second subject that is not included in the second image is included, as an ROI; and adjusting a focus of a lens included in the first camera module using only the first ROI including the second subject.

BRIEF DESCRIPTION OF THE DRAWINGS

These and/or other aspects will become apparent and more readily appreciated from the following detailed description, taken in conjunction with the accompanying drawings, in which like reference numerals refer to like elements, and wherein.

DETAILED DESCRIPTION

Figure 1A:
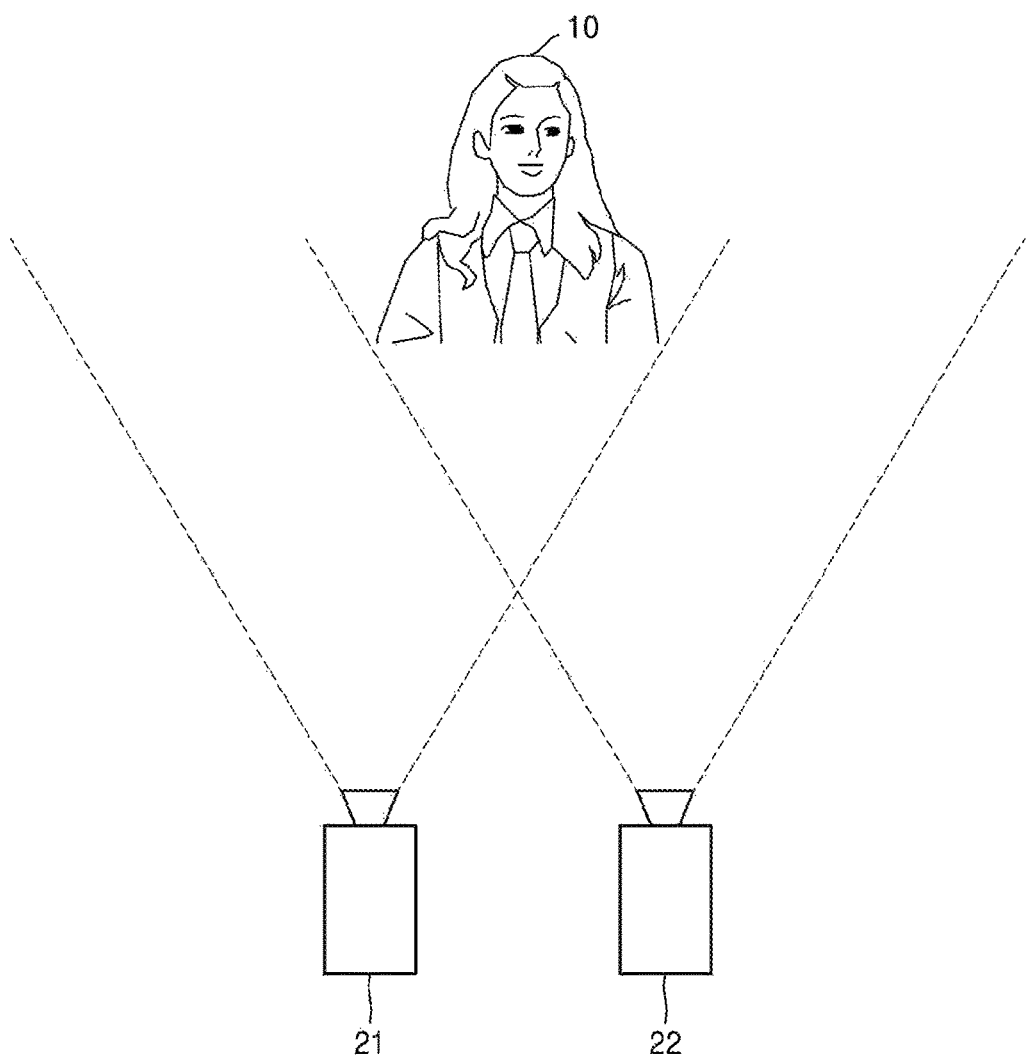
FIG. 1A is a diagram illustrating an example multiple camera system including a plurality of camera modules.

The terms used in the disclosure will be described briefly and example embodiments will then be described in greater detail.

The terms used in the disclosure are those general terms currently widely used in the art in consideration of functions in regard to the disclosure, but the terms may vary according to the intention of those of ordinary skill in the art, precedents, or new technology in the art. Specified terms may be selected by the applicant, and in this case, the meaning thereof will be described in the disclosure. Thus, the terms used in the disclosure should be understood not as simple names but based on the meaning of the terms and the overall description of the disclosure.

It will also be understood that the terms "comprises", "includes", and "has", when used herein, specify the presence of stated elements, but do not preclude the presence or addition of other elements, unless otherwise defined. Also, the terms "unit" and "module" used herein represent a unit for processing at least one function or operation, which may be implemented by hardware, software, or a combination of hardware and software.

The examples will be described with reference to the accompanying drawings in such a manner that the examples may be readily understood by a person of ordinary skill in the art. However, the disclosure may be implemented in various forms and is not limited to the examples. In addition, descriptions of well-known functions and constructions may be omitted for clarity and conciseness, and similar reference numerals are assigned to similar elements throughout the disclosure. Expressions such as "at least one of," when preceding a list of elements, modify the entire list of elements and do not necessarily modify the individual elements of the list.

Figure 1B:
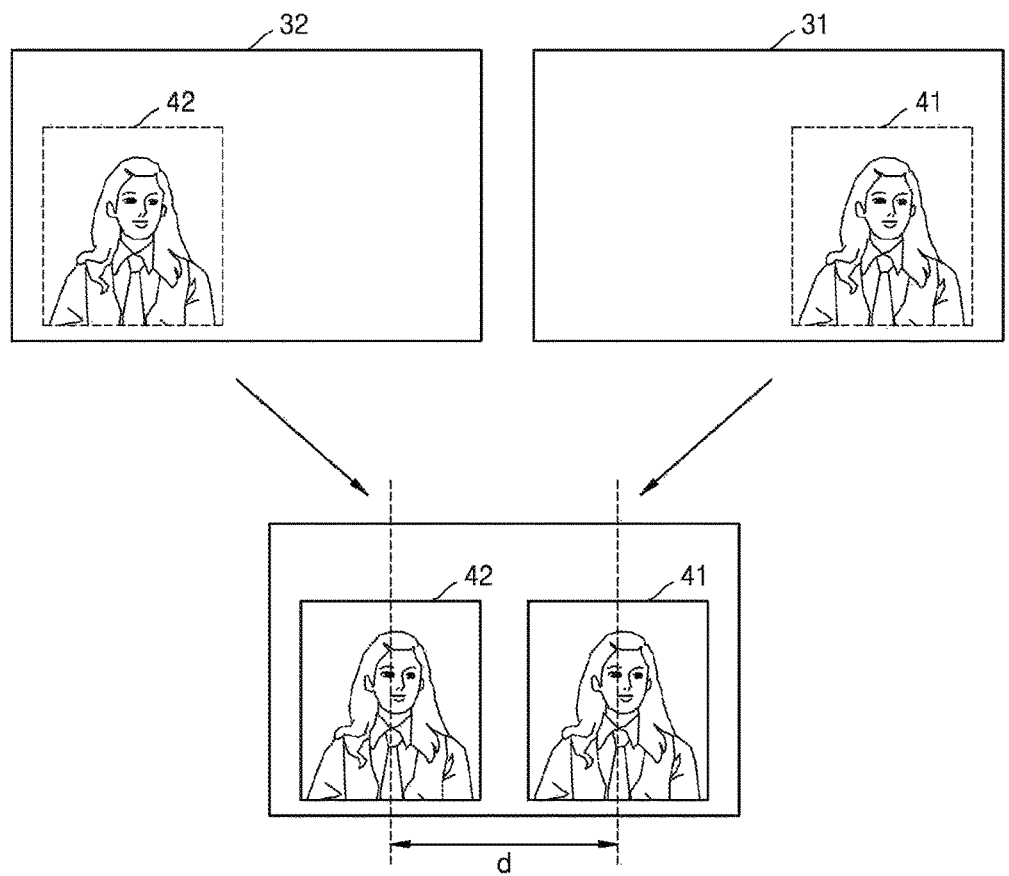
FIG. 1B is a diagram illustrating an example method of detecting a disparity in the multiple camera system of FIG. 1A.

FIG. 1A is a diagram illustrating an example multiple camera system including a plurality of camera modules, and FIG. 1B is a diagram illustrating an example method of detecting a disparity in the multiple camera system of FIG. 1A.

The multiple camera system may, for example, be a stereoscopic camera configured to generate a stereoscopic image. The multiple camera system may include a first camera module 21 and a second camera module 22. The first camera module 21 and the second camera module 22 may be disposed spaced apart from each other by a predetermined distance. The multiple camera system may detect a disparity using a first image captured by the first camera module 21 and a second image captured by the second camera module 22.

The multiple camera system will be described below in greater detail with reference to FIG. 1B.

Referring to FIG. 1B, a first image 31 is captured by the first camera module 21 of FIG. 1A and a second image 32 is captured by the second camera module 22 of FIG. 1A. Even when the first camera module 21 and the second camera module 22 have the same optical characteristics, a location of a subject 10 in the first image 31 may be different from a location of the subject 10 in the second image 32 due to different locations of the first camera module 21 and the second camera module 22. For example, since the first camera module 21 of FIG. 1A is located on the left side of the subject 10, the subject 10 included in the first image 31 is located on the right side of a vertical center line of the first image 31. Similarly, since the second camera module 22 of FIG. 1A is located on the right side of the subject 10, the subject 10 included in the second image 32 is located on the left side of a vertical center line of the second image 32.

The multiple camera system may set a region of the first image 31, in which the subject 10 is included, as a first region of interest (ROI) 41 and may set a region of the second image 32, in which the subject 10 is included, as a second ROI 42. When the first camera module 21 and the second camera module 22 have the same optical characteristics, for example, when an angle of view of a lens included in the first camera module 21 is substantially equal to an angle of view of a lens included in the second camera module 22 and a resolution of an image sensor included in the first camera module 21 is substantially equal to a resolution of an image sensor included in the second camera module 22, the multiple camera system may set a size of the first ROI 41 and a size of the second ROI 42 to be equal to each other. In addition, the multiple camera system may set the number of pixels included in the first ROI 41 (resolution of the first ROI 41) and the number of pixels included in the second ROI 42 (resolution of the second ROI 42) to be equal to each other.

However, when the first camera module 21 and the second camera module 22 have different optical characteristics, the multiple camera system may set the size of the first ROI 41 of the first image 31 and the size of the second ROI 42 of the second image 32 to be different from each other based on a difference between optical characteristics of the first camera module 21 and optical characteristics of the second camera module 22. In addition, the multiple camera system may set the number of pixels included in the first ROI 41 and the number of pixels included in the second ROI 42 to be different from each other. A description thereof will be provided below with reference to FIGS. 4A to 5.

On the other hand, referring to FIG. 1B, the multiple camera system may detect a disparity d (e.g., a location difference) between the first ROI 41 and the second ROI 42. The multiple camera system may use the detected disparity d to adjust focuses of the lenses respectively included in the first camera module 21 and the second camera module 22 or to generate a stereoscopic image. Alternatively, the multiple camera system may acquire depth information of at least one of the first ROI 41 and the second ROI 42.

Figure 2A:
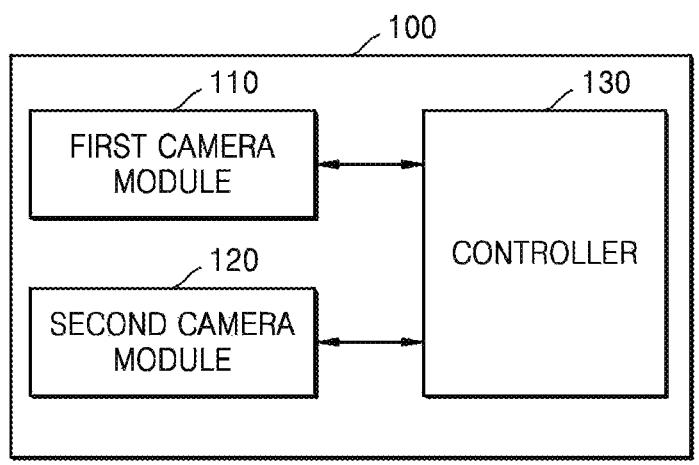
FIG. 2A is a block diagram illustrating an example image capturing apparatus.
Figure 2B:
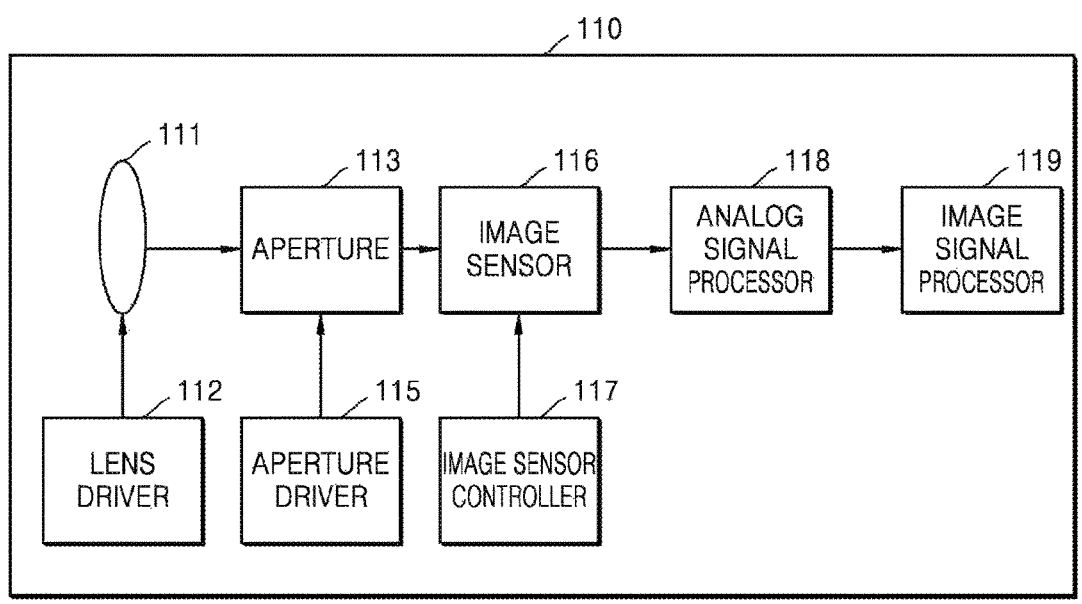
FIG. 2B is a block diagram illustrating an example first camera module included in the image capturing apparatus of FIG. 2A.

FIG. 2A is a block diagram illustrating an example image capturing apparatus 100, and FIG. 2B is a block diagram illustrating an example first camera module 110 included in the image capturing apparatus 100 of FIG. 2A.

Referring to FIG. 2A, the image capturing apparatus 100 may include a first camera module 110, a second camera module 120, and a controller 130. The image capturing apparatus 100 according to the example may be a multiple camera system including a plurality of camera modules, which has been described above, for example, with reference to FIG. 1A. In addition, the image capturing apparatus 100 may be implemented in various forms. For example, the image capturing apparatus 100 may be a digital still camera configured to capture a still image, a digital video camera configured to capture a video, or the like. Furthermore, the image capturing apparatus 100 may, for example, be a digital single lens reflex (DSLR) camera, a mirroless camera, or a smartphone. However, the image capturing apparatus 100 is not limited thereto. The image capturing apparatus 100 according to the example may be an apparatus including a plurality of camera modules each including a lens and an imaging element configured to capture a subject and generate an image.

FIG. 2B is a block diagram of the first camera module 110 included in the image capturing apparatus 100 of FIG. 2A.

Referring to FIG. 2B, the first camera module 110 may include a lens 111, a lens driver 112, an aperture 113, an aperture driver 115, an image sensor 116, an image sensor controller 117, an analog signal processor 118, and an image signal processor 119.

The lens 111 may include a plurality of lens groups each having a plurality of lens elements. The lens driver 112 may be configured to adjust a location of the lens 111. For example, the lens driver 112 may adjust the location of the lens 111 based on a control signal provided by the controller 130 (see FIG. 2A). The lens driver 112 may be configured to adjust a focal length by adjusting the location of the lens 111 and may also be configured to perform autofocusing, zoom adjustment, focus adjustment, or the like.

The aperture driver 115 may be configured to adjust a degree of opening of the aperture 113 so as to adjust an amount of light incident on the image sensor 116.

An optical signal, which has passed through the lens 111 and the aperture 113, may form an image of a subject on a light-receiving surface of the image sensor 116. The image sensor 116 may, for example, be a charge-coupled device (CCD) image sensor or a complementary metal-oxide semiconductor image sensor (CIS), or the like, configured to convert an optical signal into an electrical signal. The image sensor controller 117 may be configured to adjust the sensitivity or the like of the image sensor 116. The image sensor controller 117 may be configured to control the image sensor 116 based on a control signal. The control signal may be automatically generated by an image signal that is input in real time or may be manually input.

The analog signal processor 118 may be configured to perform noise reduction, gain control, waveform shaping, and analog-to-digital conversion (ADC) on an analog signal provided from the image sensor 116 and to generate an image data signal.

The image signal processor 119 may be configured to perform a specific function on the image data signal processed by the analog signal processor 118. For example, for image quality enhancement and special effects, the image signal processor 119 may be configured to perform image signal processing, such as noise reduction, gamma correction, color filter array interpolation, color matrix, color correction, and color enhancement, white balancing, luminance smoothing, and color shading, with respect to input image data signal. The image signal processor 119 may be configured to compress the input image data into an image file, or may be configured to reconstruct the image data from the image file. An image compression format may be reversible or irreversible. For example, a still image may be compressed into a Joint Photographic Experts Group (JPEG) format or a JPEG 2000 format. In the case of recording a video, a plurality of frames may be compressed into a video file in accordance with the Moving Picture Experts Group (MPEG) standard. For example, an image file may be generated in accordance with the exchangeable image file format (Exif) standard.

The image signal processor 119 may be configured to generate a video file from an imaging signal generated by the image sensor 116. The imaging signal may, for example, be a signal that is generated by the image sensor 116 and is then processed by the analog signal processor 118. The image signal processor 119 may be configured to generate frames to be included in a video file from an imaging signal, code the frames in accordance with an appropriate standard, for example, MPEG4, H.264/AVC, or windows media video (WMV), compress a video, and generate a video file by using the compressed video. The video file may be generated in various formats, such as mpg, mp4, 3gpp, avi, asf, or mov. The image signal processor 119 may be configured to output the generated video file to the controller 130.

In addition, the image signal processor 119 may be configured to perform sharpness processing, chromatic processing, blurring processing, edge emphasis processing, image interpretation processing, image recognition processing, image effect processing, and the like. The image recognition processing may, for example, include face recognition processing and scene recognition processing. The image signal processor 119 may perform image signal processing to display image data on a display device. For example, the image signal processor 119 may be configured to perform luminance level adjustment, color correction, contrast adjustment, contour emphasis adjustment, screen splitting, character image generation, and image synthesis.

Similar to the first camera module 110, the second camera module 120 may include a lens, a lens driver, an aperture, an aperture driver, an image sensor, an image sensor controller, an analog signal processor, and an image signal processor. Since these elements of the second camera module 120 are similar to those of the first camera module 110, redundant descriptions thereof will be omitted.

According to the example, the first camera module 110 and the second camera module 120 may have different optical characteristics. The optical characteristics of each of the first and second camera modules 110 and 120 may be determined based on at least one of an angle of view of the lens included in the camera module and a resolution of the image sensor included in the camera module. The angle of view of the lens represents an angle (capturing range) at which an image is capable of being captured by the lens included in the camera module. As the angle of view becomes wider, it is possible to capture an image in a wider range. In addition, the resolution of the image sensor may be determined based on the number of pixels included in the image sensor. As the number of the pixels included in the image sensor increases, the resolution of the image sensor increases.

According to the example, the angle of view of the lens 111 included in the first camera module 110 may be different from the angle of view of the lens included in the second camera module 120. For example, when the lens 111 included in the first camera module 110 is a wide-angle lens and the lens included in the second camera module 120 is a telephoto lens, the first camera module 110 may capture an image in a wider range than the second camera module 120 because the wide-angle lens has a wider angle of view than the telephoto lens. Alternatively, when the lens included in one of the first camera module 110 and the second camera module 120 is a zoom lens and the lens included in the other thereof is a single lens, the angle of view of the first camera module 110 may be different from the angle of view of the second camera module 120.

In addition, according to the example, the resolution of the image sensor 116 included in the first camera module 110 may be different from the resolution of the image sensor included in the second camera module 120. For example, the resolution of the image sensor 116 included in the first camera module 110 may be lower than the resolution of the image sensor included in the second camera module 120, or the resolution of the image sensor included in the second camera module 120 may be higher than the resolution of the image sensor 116 included in the first camera module 110.

Referring to FIG. 2A, the controller 130 may be configured to control the overall operation of the image capturing apparatus 100. The controller 130 may be configured to provide control signals to the elements of the image capturing apparatus 100 to control the elements of the image capturing apparatus 100.

The controller 130 may be configured to process an input image signal and to control the elements of the image capturing apparatus 100 based on the processed image signal or an external input signal. The controller 130 may include one or more processors. The one or more processors may be implemented by an array of a plurality of logic gates, or may be implemented by a combination of a general-purpose microprocessor and a memory that stores a program executable in the general-purpose microprocessor. In addition, it will be apparent to one of ordinary skill in the art that the one or more processors may be implemented by other types of hardware.

The controller 130 may be configured to generate control signals for controlling autofocusing, zoom adjustment, focus adjustment, automatic exposure compensation, and the like by, for example, executing the stored program or by using a separate module, and to provide the control signals to the aperture drivers, the lens drivers, and the image sensor controllers respectively included in the first camera module 110 and the second camera module 120, and to control the overall operations of the elements of the image capturing apparatus 100, such as a shutter and a stroboscope.

In addition, the controller 130 may be connected to an external monitor and be configured to perform image signal processing and to generate image data so that an image signal input from the image signal processor of the first camera module 110 or the second camera module 120 is displayed on the external monitor. The controller 130 may be configured to transmit processed image data to the external monitor so that an image corresponding to the processed image data is displayed on the external monitor.

According to the example, the controller 130 may be configured to set predetermined regions including the same subject in a first image captured by the first camera module 110 and a second image captured by the second camera module 120 as ROIs. For example, the controller 130 may be configured to set a predetermined region of the first image, in which a specific subject is included, as a first ROI. A size of the first ROI may be set in advance or may be set by an input. In addition, the controller 130 may be configured to detect a second ROI matching the first ROI from the second image based on a difference between the optical characteristics of the first camera module 110 and the optical characteristics of the second camera module 120.

The controller 130 may be configured to determine a size of the second ROI to be set in the second image based on the size of the first ROI set in the first image and a difference between an angle of view of the lens 111 included in the first camera module 110 and an angle of view of the lens included in the second camera module 120. For example, when the angle of view of the lens 111 included in the first camera module 110 is wider than the angle of view of the lens included in the second camera module 120, the controller 130 may be configured to set the size of the second ROI to be larger than the size of the first ROI.

In addition, the controller 130 may be configured to determine the number of pixels included in the second ROI based on the number of pixels included in the first ROI and a difference between a resolution of the image sensor 116 included in the first camera module 110 and a resolution of the image sensor included in the second camera module 120.

For example, when the resolution of the image sensor 116 included in the first camera module 110 is higher than the resolution of the image sensor included in the second camera module 120, the controller 130 may be configured to set the number of pixels included in the second ROI to be larger than the number of pixels included in the first ROI.

The controller 130 may be configured to adjust focuses of the lenses respectively included in the first camera module 110 and the second camera module 120 based on disparity information of the first ROI and the second ROI. In addition, the controller 130 may be configured to detect depth information of at least one of the first ROI and the second ROI based on the disparity information of the first ROI and the second ROI.

When a predetermined region of the first image, in which a second subject that is not included in the second image is included, is set as the first ROI, the controller 130 may be configured to adjust the focus of the lens 111 included in the first camera module 110 using only the first ROI in which the second subject is included. For example, the image capturing apparatus 100 may adjust the focus of the lens 111 by changing a focus detection method to a contrast autofocus (AF) method of detecting a focus using only the first camera module 110. In addition, when a predetermined region of the second image, in which a second subject that is not included in the first image is included, is set as the second ROI, the controller 130 may be configured to adjust the focus of the lens included in the second camera module 120 using only the second ROI in which the second subject is included. For example, the image capturing apparatus 100 may adjust the focus of the lens by changing a focus detection method to a contrast AF method of detecting a focus using only the second camera module 120.

Figure 3:
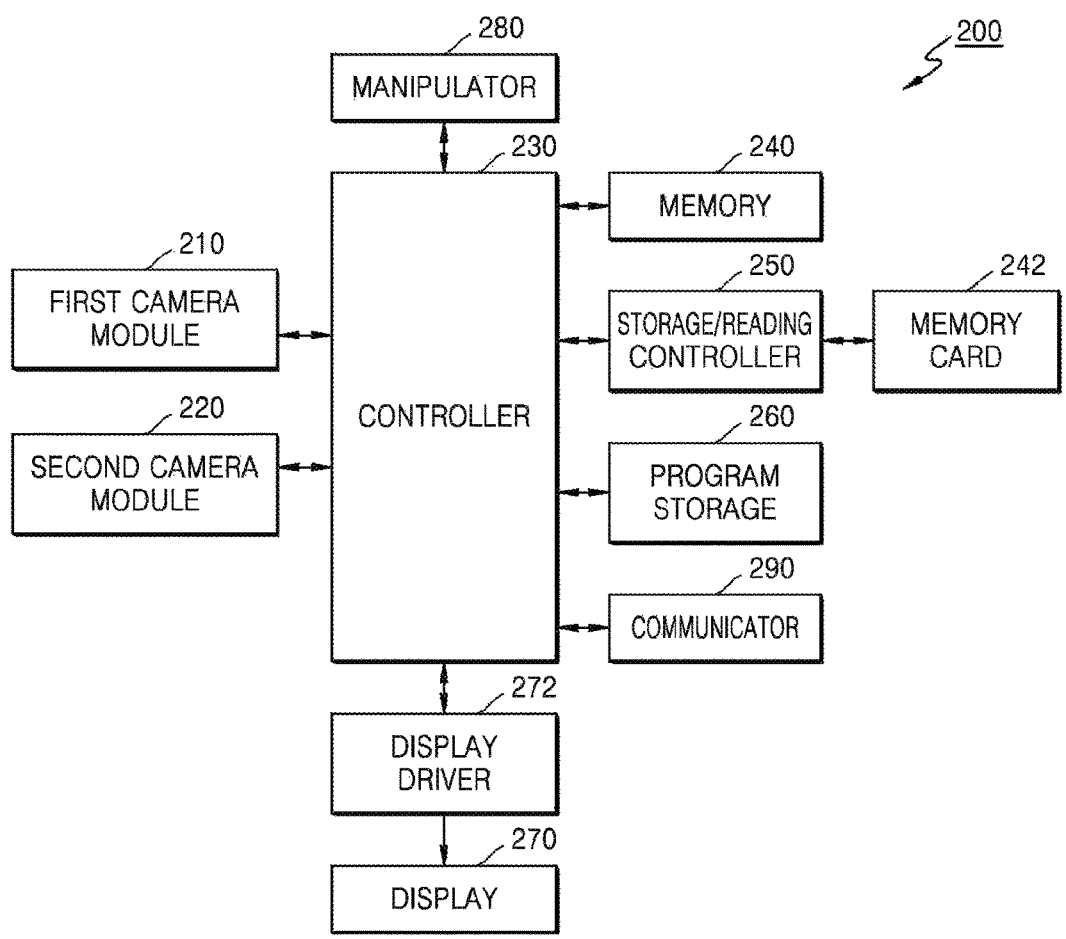
FIG. 3 is a block diagram illustrating an example image capturing apparatus.

FIG. 3 is a block diagram illustrating an example image capturing apparatus 200.

Referring to FIG. 3, the image capturing apparatus 200 may include a first camera module 210, a second camera module 220, a controller 230, a memory 240, a storage/reading controller 250, a memory card 242, a program storage 260, a display 270, a display driver 272, a manipulator 280, and a communicator 290.

Since the first camera module 210, the second camera module 220, and the controller 230 of FIG. 3 correspond to the first camera module 110, the second camera module 120, and the controller 130 of FIG. 2A, respectively, redundant descriptions thereof will be omitted and the other elements will be described below.

Referring to FIG. 3, the storage/reading controller 250 may store image data output from the first camera module 210 or the second camera module 220 in the memory card 242. For example, the storage/reading controller 250 may store the image data automatically or in response to a signal input manually. In addition, the storage/reading controller 250 may read image data from an image file stored in the memory card 242 and input the read image data to the display driver 272 through the memory 240 or another path so as to display an image on the display device 270.

The memory card 242 may be detachably or permanently attached to the image capturing apparatus 200. For example, the memory card 242 may be a flash memory card such as a secure digital (SD) card.

An image signal, which is processed by the first camera module 210 or the second camera module 220, may be input to the controller 230 directly or through the memory 240. The memory 240 may operate as a main memory of the image capturing apparatus 200 and temporarily store information necessary for the operation of the image capturing apparatus 200. The program storage 260 may store programs such as an operating system and an application system for driving the image capturing apparatus 200.

The display 270 may display an operating state of the image capturing apparatus 200 or image information acquired by the image capturing apparatus 200. The first camera module 210 and the second camera module 220 may perform image signal processing to display the captured image information on the display 270. For example, the first camera module 210 and the second camera module 220 may perform luminance level adjustment, color correction, contrast adjustment, contour emphasis, screen splitting, character image generation, and image synthesis with respect to the acquired image information.

The display 270 may provide visual information to the user. In order to provide the visual information, the display 270 may, for example, include a liquid crystal display (LCD) panel or an organic light-emitting display (OLED) panel, or the like. In addition, the display 270 may include a touch screen capable of recognizing a touch input.

The display driver 272 may provide a driving signal to the display 270.

The manipulator 280 may allow the input of control signals. The manipulator 280 may include various function buttons, such as a shutter-release button configured to input a shutter-release signal for capturing an image by exposing an image sensor to light for a predetermined period of time, a power button configured to input a control signal for controlling a power on/off state of the image capturing apparatus 200, a zoom button configured to widen or narrow an angle of view according to an input, a mode selection button, and other buttons configured to adjust capturing setting values. The manipulator 280 may also be implemented in any form, such as a button, a keyboard, a touch pad, a touch screen, or a remote controller, as long as the manipulator 280 allows input of the control signals.

The communicator 290 may include communication circuitry, such as, for example, a network interface card (NIC) or a modem and may allow the image capturing apparatus 200 to communicate with an external device via a network in a wired and/or wireless manner.

The block diagrams of the image capturing apparatuses 100 and 200 of FIGS. 2A, 2B, and 3, are merely examples. The elements in the block diagrams may be integrated, added, or omitted according to the specifications of the image capturing apparatuses 100 and 200. For example, if necessary, two or more elements may be integrated into one element, or one element may be subdivided into two or more elements. In addition, the functions of the respective blocks are provided only for describing the examples, and specific operations or devices are not intended to limit the scope of the disclosure.

FIGS. 4A to 4D are diagrams illustrating an example method of detecting a second ROI when the angle of view of the lens 111 included in a first camera module 110 is different from the angle of view of the lens included in a second camera module 120.

Figure 4A:
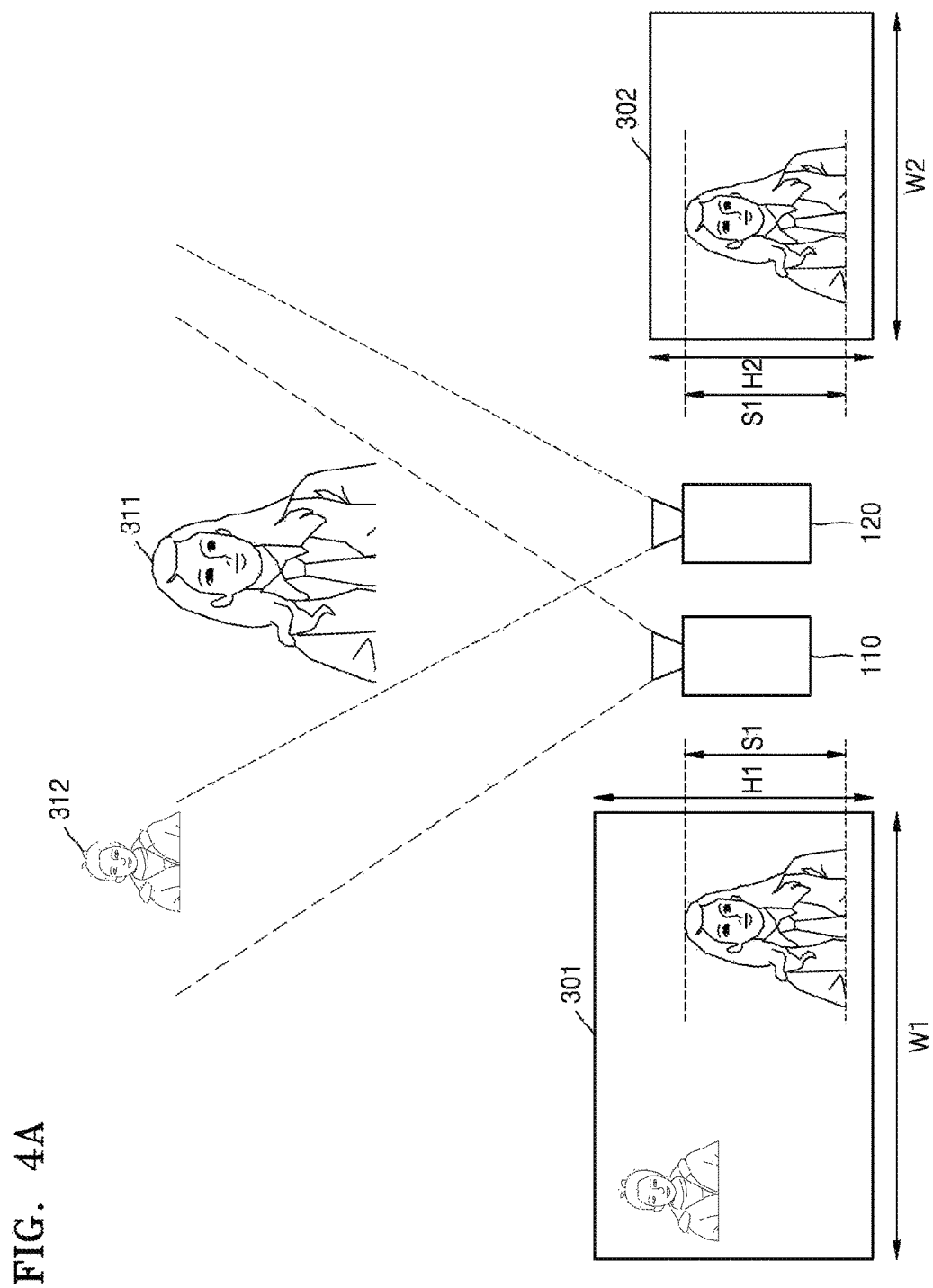
FIGS. 4A to 4D are diagrams illustrating an example method of detecting a second region of interest (ROI), when an angle of view of a lens included in a first camera module is different from an angle of view of a lens included in a second camera module.

Referring to FIG. 4A, the angle of view of the lens included in the first camera module 110 may be different from the angle of view of the lens included in the second camera module 120. For example, if the lens included in the first camera module 110 is a wide-angle lens and the lens included in the second camera module 120 is a telephoto lens, the first camera module 110 may capture an image in a wider range than the second camera module 120 because the wide-angle lens has a wider angle of view than the telephoto lens. Alternatively, if the lens included in one of the first camera module 110 and the second camera module 120 is a zoom lens and the lens included in the other thereof is a single lens, the angle of view of the first camera module 110 may be different from the angle of view of the second camera module 120.

As illustrated in FIG. 4A, when the angle of view of the lens included in the first camera module 110 is wider than the angle of view of the lens included in the second camera module 120, the first camera module 110 may have a first capturing range 301 including both a first subject 311 and a second subject 312, and the second camera module 120 may have a second capturing range 302 including only the first subject 311.

In FIG. 4A, when a height of the first capturing range 301 is H1, a height of the second capturing range 302 may be H2 which is lower than H1. In addition, the first subject 311 included in the first capturing range 301 and the first subject 311 included in the second capturing range 302 may have the same height S1.

Figure 4B:
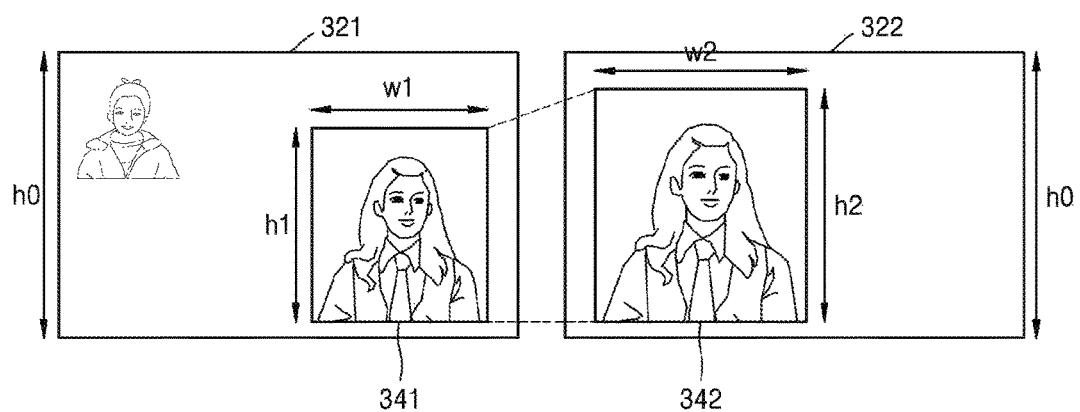

FIG. 4B is a diagram illustrating a first image 321 and a second image 322 that are respectively captured by the first camera module 110 and the second camera module 120 of FIG. 4A.

When a size of the image sensor included in the first camera module 110 is substantially equal to a size of the image sensor included in the second camera module 120, a size of an image output by the first camera module 110 may be substantially equal to a size of an image output by the second camera module 120. When the heights of the first image 321 and the second image 322 are H0, the height of the first subject included in the first image 321 is H0*S1/H1 and the height of the first subject included in the second image 322 is H0*S1/H2. Therefore, the height of the first subject included in the second image 322 may appear to be greater than the height of the first subject included in the first image 321. The above description has been given in terms of only the height of the subject, but may also be equally applied in terms of, for example, a width of the subject.

Referring to FIG. 4B again, the image capturing apparatus 100 may set a first ROI 341 including the first subject in the first image 321. A size of the first ROI 341 may be set according to a size of the first subject. When the first ROI 341 is set in the first image 321, the image capturing apparatus 100 may determine a size of the second ROI 342 based on a difference between the first capturing range 301 of the first camera module 110 and the second capturing range 302 of the second camera module 120.

For example, as described above, the image capturing apparatus 100 may calculate the height of the first subject included in the first image 321 as H0*S1/H1 and the height of the first subject included in the second image 322 as H0*S1/H2 using the first capturing range 301 of the first camera module 110 and the second capturing range 302 of the second camera module 120. Accordingly, a ratio of the height of the first subject included in the first image 321 to the height of the first subject included in the second image 322 may be determined as H1 (the height of the first capturing range)/H2 (the height of the second capturing range). Similarly, a ratio of a width of the first subject included in the first image 321 to a width of the first subject included in the second image 322 may be determined as W1 (the width of the first capturing range)/W2 (the width of the second capturing range).

The ratio of the height of the first subject included in the first image 321 to the height of the first subject included in the second image 322 may be equally applied to a ratio of a height of the first ROI 341 to a height of the second ROI 342. Therefore, when the height of the first ROI 341 is h1, the height h2 of the second ROI 342 may be determined as h1*H1/H2. In addition, the ratio of the width of the first subject included in the first image 321 to the width of the first subject included in the second image 322 may be equally applied to a ratio of a width of the first ROI 341 to a width of the second ROI 342. Therefore, when the width of the first ROI 341 is w1, the height w2 of the second ROI 342 may be determined as w1*W1/W2.

When the size of the second ROI 342 is determined, the image capturing apparatus 100 may determine the location of the second ROI 342 matching the first ROI 341 by comparing pixel values of the first ROI 341 with pixel values of the second ROI 342 while moving the second ROI 342 within the second image 322.

For example, after scaling the size of the second ROI 342 to the size of the first ROI 341, the image capturing apparatus 100 may compare the pixel values of the first ROI 341 with the pixel values of the second ROI 342. Alternatively, after scaling the size of the first ROI 341 to the size of the second ROI 342, the image capturing apparatus 100 may compare the pixel values of the first ROI 341 with the pixel values of the second ROI 342.

Figure 4C:
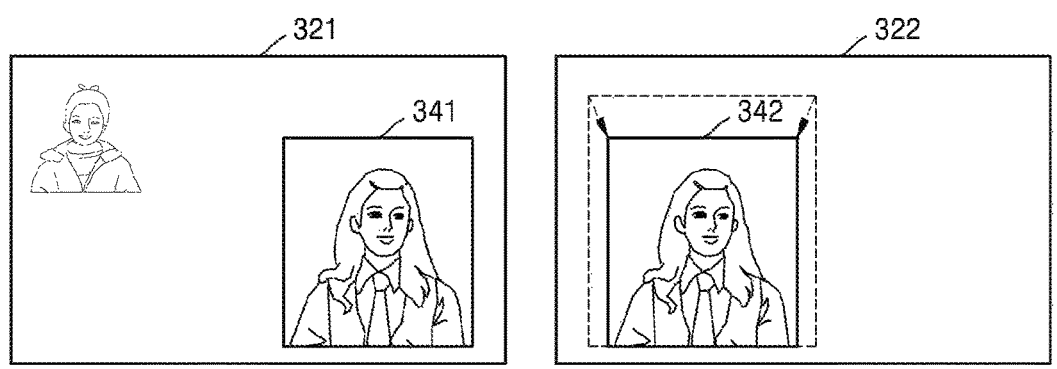

When the second ROI 342 matching the first ROI 341 is detected, the image capturing apparatus 100 may determine a disparity between the first ROI 341 and the second ROI 342. As illustrated in FIG. 4C, when the size of the second ROI 342 is larger than the size of the first ROI 341, the image capturing apparatus 100 may scale the size of the second ROI 342 to the size of the first ROI 341. However, the disclosure is not limited thereto. The size of the first ROI 341 may be scaled to the size of the second ROI 342.

Figure 4D:
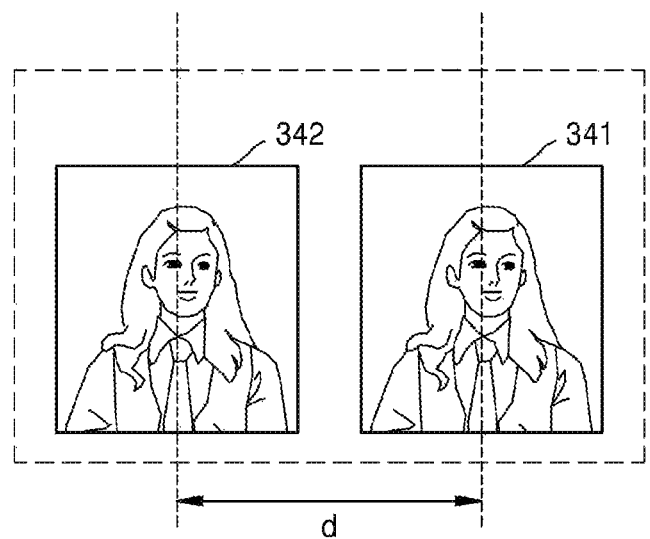

FIG. 4D is a diagram illustrating a disparity d between the first ROI 341 and the second ROI 342. The image capturing apparatus 100 may perform the autofocusing of the first camera module 110 and the second camera module 120 based on the disparity d. Alternatively, the image capturing apparatus 100 may detect depth information of at least one of the first ROI 341 and the second ROI 342 based on the disparity d.

Figure 5:
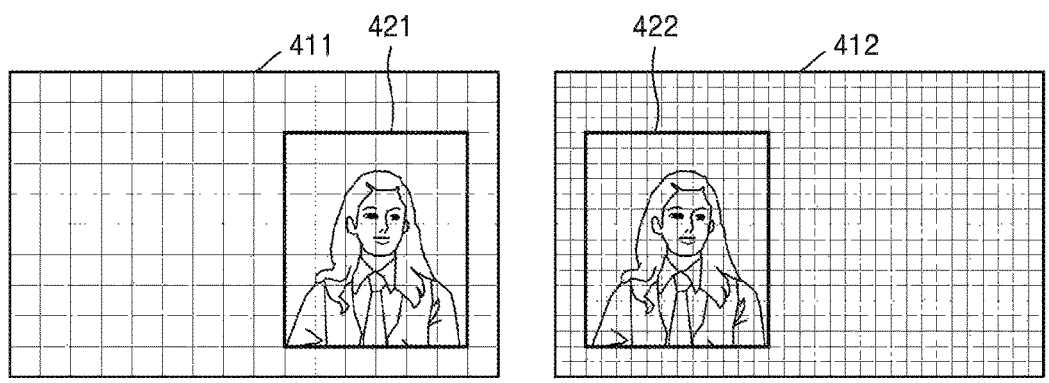
FIG. 5 is a diagram illustrating an example method of detecting a second ROI, when a resolution of an image sensor included in a first camera module is different from a resolution of an image sensor included in a second camera module.

FIG. 5 is a diagram illustrating an example method of detecting the second ROI when the resolution of the image sensor included in the first camera module 110 is different from the resolution of the image sensor included in the second camera module 120.

Referring to FIG. 5, the resolution of the image sensor included in the first camera module 110 may be different from the resolution of the image sensor included in the second camera module 120. For example, the resolution of the image sensor may be determined based on the number of pixels included in the image sensor. As the number of the pixels included in the image sensor increases, the resolution of the image sensor increases.

For example, the resolution of the image sensor included in the first camera module 110 may be lower than the resolution of the image sensor included in the second camera module 120, or the resolution of the image sensor included in the second camera module 120 may be higher than the resolution of the image sensor included in the first camera module 110. Accordingly, a resolution of a first image 411 captured by the first camera module 110 may be lower than a resolution of a second image 412 captured by the second camera module 120. In addition, the resolution of the second image 412 may be higher than the resolution of the first image 411.

Referring to FIG. 5, the number of pixels included in the second image 412 may, for example, be four times the number of pixels included in the first image 411.

The image capturing apparatus 100 may set a first ROI 421 including a first subject in the first image 411. For example, the number of pixels included in the first ROI 421 may be set based on the size of the first subject. When the first ROI 421 is set in the first image 411, the image capturing apparatus 100 may determine the number of pixels included in the second ROI 422 based on a difference between the resolution of the first image 411 (the resolution of the image sensor included in the first camera module 110) and the resolution of the second image 412 (the resolution of the image sensor included in the second camera module 120).

For example, as illustrated in FIG. 5, when the size of the first image 411 is substantially equal to the size of the second image 412 and the number of pixels included in the second image 412 is four times the number of pixels included in the first image 411, the image capturing apparatus 100 may set the size of the second ROI 422 so that the number of pixels included in the second ROI 422 is four times the number of pixels included in the first ROI 421.

When the size of the second ROI 422 is determined, the image capturing apparatus 100 may determine the location of the second ROI 422 matching the first ROI 421 by comparing pixel values of the first ROI 421 with pixel values of the second ROI 422 while moving the second ROI 422 within the second image 412.

For example, the image capturing apparatus 100 may compare the pixel values of the first ROI 421 with the pixel values of the second ROI 422, taking into consideration a ratio of the resolution of the first ROI 421 (the number of pixels included in the first ROI 421) to the resolution of the second ROI 422 (the number of pixels included in the second ROI 422).

When the second ROI 422 matching the first ROI 421 is detected, the image capturing apparatus 100 may determine a disparity between the first ROI 421 and the second ROI 422. In addition, when a disparity between the first ROI 421 and the second ROI 422 is detected, the image capturing apparatus 100 may perform the autofocusing of the first camera module 110 and the second camera module 120 based on the detected disparity. In addition, the image capturing apparatus 100 may detect depth information of at least one of the first ROI 421 and the second ROI 422 based on the detected disparity.

Figure 6:
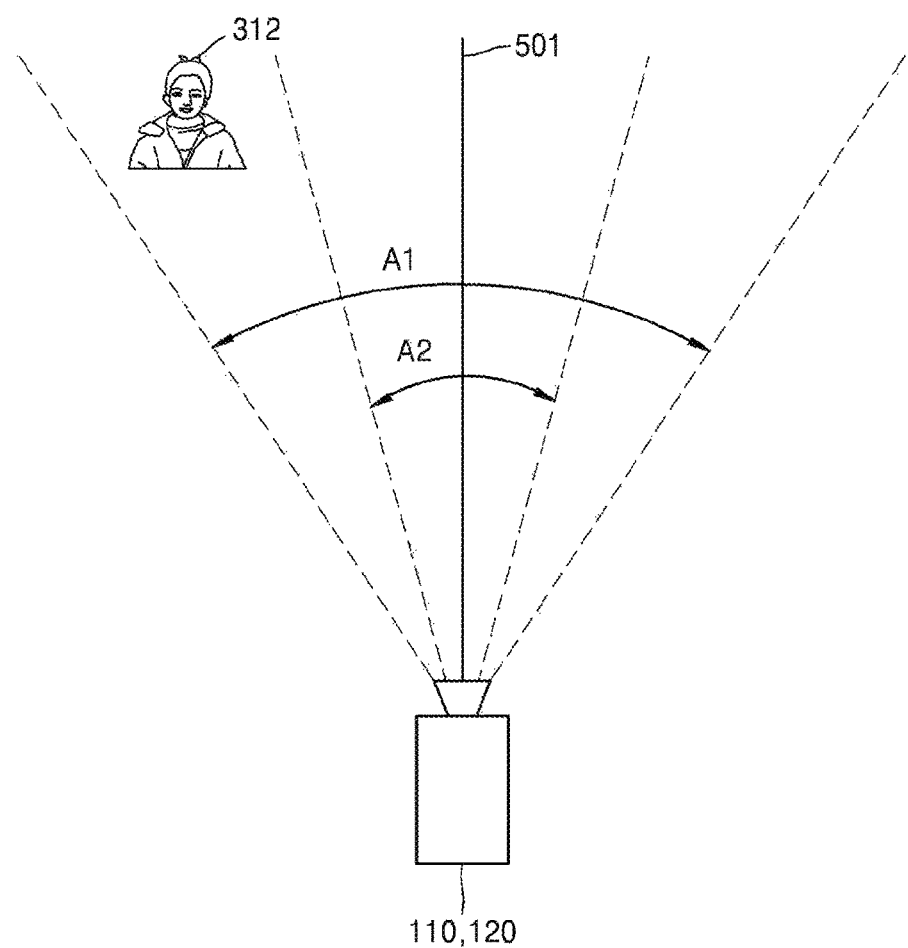
FIG. 6 is a diagram illustrating an example method of operating an image capturing apparatus, when a subject in an image captured by only a first camera module is set as an ROI, according to an exemplary embodiment.

FIG. 6 is a diagram illustrating an example method of operating an image capturing apparatus, when a subject 312 in an image captured by only the first camera module 110 is set as an ROI.

The image capturing apparatus 100 according to the example may determine whether a subject included in a first image captured by the first camera module 110 (a subject set as an ROI) is included in a second image captured by the second camera module 120, based on optical characteristics of the first camera module 110 and the second camera module 120.

FIG. 6 is a diagram illustrating locations of the first camera module 110, the second camera module 120, and the second subject 312, according to an example. In FIG. 6, for convenience of description, it is assumed that the first camera module 110 and the second camera module 120 are located at the same location, but the disclosure is not limited thereto.

When an angle of view of the lens included in the first camera module 110 is wider than an angle of view of the lens included in the second camera module 120, the first camera module 110 may capture an image in a wider range than the second camera module 120. For example, when an angle A1 of view of the first camera module 110 is twice as wide as an angle A2 of view of the second camera module 120, the capturing range of the first camera module 110 may be twice as wide as the capturing range of the second camera module 120.

When the second subject 312 set as the ROI in the first image is positioned at a location deviated from a center 501 of the first camera module 110 by ½ or more of the angle of view of the first camera module 110, the second subject 312 may not be captured by the second camera module 120.

Accordingly, the image capturing apparatus 100 may determine whether the second subject 312 is included in the second image captured by the second camera module 120, based on the optical characteristics of the first camera module 110 and the second camera module 120 and the location of the second subject 312 set as the ROI. When the second subject 312 set as the ROI in the first image is not captured by the second camera module 120, the image capturing apparatus 100 may adjust the focus of the lens included in the first camera module 110 using only the first ROI set in the first image, i.e., the second subject 312.

Figure 7A:
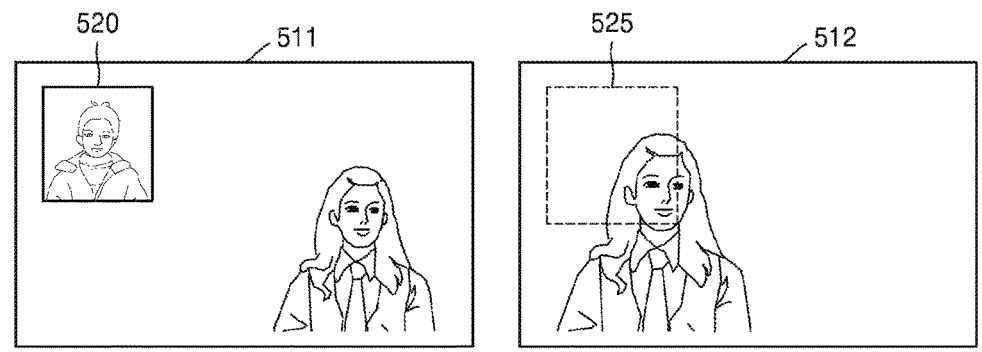
FIGS. 7A and 7B are diagrams illustrating an example method of operating an image capturing apparatus, when a region in an image captured by only a first camera module is set as an ROI.
Figure 7B:
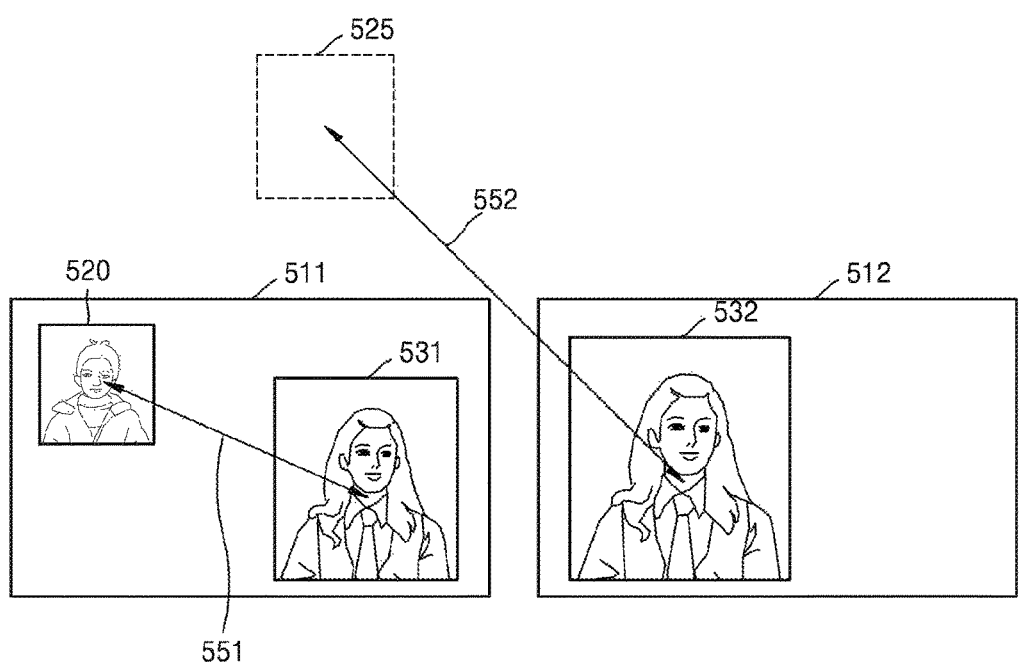

FIGS. 7A and 7B are diagrams illustrating an example method of operating the image capturing apparatus 100, when a region captured by only the first camera module 110 is set as an ROI.

FIG. 7A is a diagram illustrating a first image 511 and a second image 512, which are respectively captured by the first camera module 110 and the second camera module 120 of FIG. 4A. As described above with reference to FIG. 4A, when the angle of view of the lens included in the first camera module 110 is wider than the angle of view of the lens included in the second camera module 120, the first camera module 110 may capture an image in a wider range than the second camera module 120.

Referring to FIG. 7A, the first image 511 includes the first subject 311 and the second subject 312 of FIG. 4A, but the second image 512 includes only the first subject 311.

The image capturing apparatus 100 may set a predetermined region including the second subject 312 as a first ROI 520 based on an input selecting the second subject 312.

For example, the image capturing apparatus 100 may display the captured first image 511 on a display device (for example, a touch screen) and may receive an input of, for example, touching a region of the first image 511 in which the second subject 312 is displayed. The image capturing apparatus 100 may set the first ROI 520 including the second subject. In this case, the size of the first ROI 520 may be set according to the size of the second subject 312.

On the other hand, the image capturing apparatus 100 may determine whether the second subject 312 is included in the second image 512, based on a difference between the capturing range of the first camera module 110 and the capturing range of the second camera module 120.

For example, the image capturing apparatus 100 may determine the size of the second ROI 525 based on the size of the first ROI 520 and the difference between the capturing range of the first camera module 110 and the capturing range of the second camera module 120, which are obtained using the method described above with reference to FIGS. 4A to 4D. When the size of the second ROI 525 is determined, the image capturing apparatus 100 may determine the location of the second ROI 525 matching the first ROI 520 by comparing pixel values of the first ROI 525 with pixel values of the second ROI 520 while moving the second ROI 525 within the second image 512.

When a similarity between the pixel values of the first ROI 520 and the pixel values of the second ROI 525 is substantially equal to or less than a threshold value, it means that a region matching the first ROI 520 is not present in the second image 512, and the image capturing apparatus 100 may determine that the second subject 312 is not included in the second image 512.

In addition, referring to FIG. 7B, the image capturing apparatus 100 may determine whether the second subject 312 is included in the second image 512 by using a location relationship between the first subject 311, which is commonly included in the first image 511 and the second image 512, and the second subject 312.

For example, as described above with reference to FIGS. 4A to 4D, if the sizes and the locations of ROIs 531 and 532 each including the first subject 311 are determined within the first image 511 and the second image 512, it is possible to determine the location of the first ROI 520 (ROI including the second subject 312) within the first image 511 with reference to the ROI 531. In addition, the image capturing apparatus 100 may determine the location of the second ROI 525 within the second image 512 with reference to the ROI 532 including the first subject 311 based on the difference between the optical characteristics (e.g., the capturing range) of the first camera module 110 and the optical characteristics (e.g., the capturing range) of the second camera module 120. The image capturing apparatus 100 may determine whether the second subject 312 is included in the second image 512 by determining whether the determined location of the second ROI 525 is present within the second image 525.

For example, the image capturing apparatus 100 may determine a relative location relationship 551 between the ROI 531 and the first ROI 520 within the first image 511. In addition, the image capturing apparatus 100 may determine a relative location relationship 552 between the ROI 532 and the second ROI 525 within the second image 512 using the determined relative location relationship 551 and the difference between the optical characteristics (e.g., the capturing range) of the first camera module 110 and the optical characteristics (e.g., the capturing range) of the second camera module 120. Accordingly, the image capturing apparatus 100 may determine that the second ROI 525 is located outside the second image 512 and the second subject 312 is not included in the second image 512.

When the second subject 312 is not included in the second image 512, the image capturing apparatus 100 may adjust the focus of the lens included in the first camera module 110 using only the first ROI 520 set in the first image 511.

Figure 8:
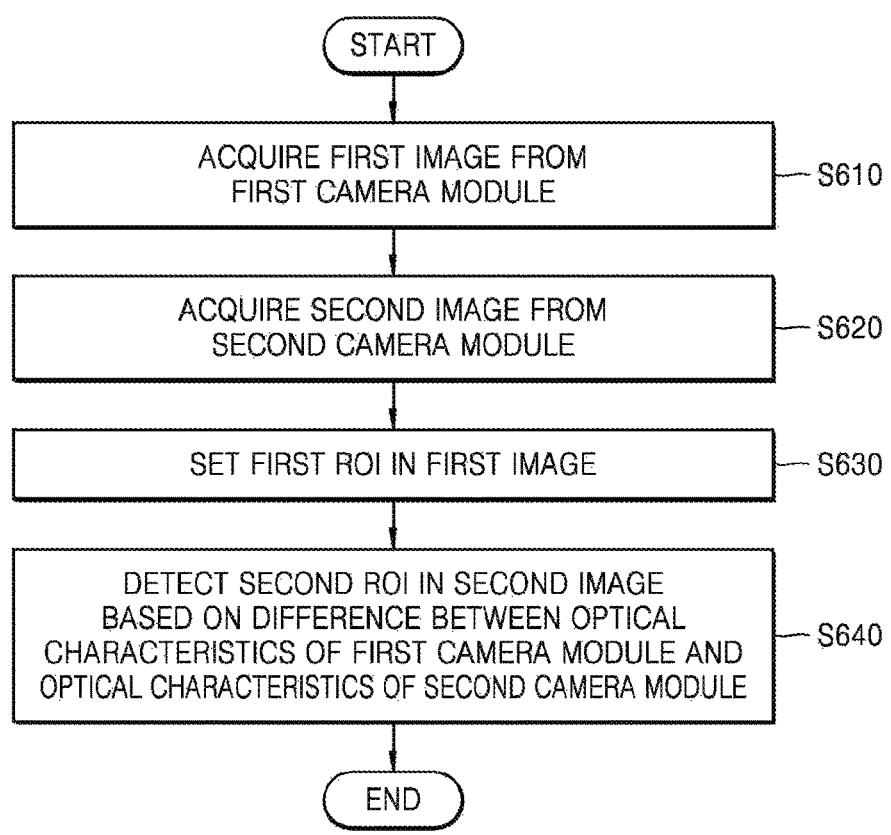
FIG. 8 is a flowchart illustrating an example method of operating an image capturing apparatus.

FIG. 8 is a flowchart illustrating an example method of operating the image capturing apparatus 100.

Referring to FIG. 8, in operation S610, the image capturing apparatus 100 may acquire a first image from the first camera module 110.

For example, the image capturing apparatus 100 may acquire the first image by capturing a first subject by using the first camera module 110.

In operation S620, the image capturing apparatus 100 may acquire a second image from the second camera module 120.

In this case, the optical characteristics of the first camera module 110 may be different from the optical characteristics of the second camera module 120. For example, the angle of view of the lens included in the first camera module 110 may be different from the angle of view of the lens included in the camera module 120. As described above with reference to FIG. 4A, when the angle of view of the lens included in the first camera module 110 is different from the angle of view of the lens included in the second camera module 120, the capturing range of the first camera module 110 may be different from the capturing range of the second camera module 120.

Alternatively, the resolution of the image sensor included in the first camera module 110 may be different from the resolution of the image sensor included in the second camera module 120. As described above with reference to FIG. 5, when the resolution of the image sensor included in the first camera module 110 is different from the resolution of the image sensor included in the second camera module 120, the resolution of the first image may be different from the resolution of the second image.

In operation S630, the image capturing apparatus 100 may set a first ROI in the first image.

The image capturing apparatus 100 may set a first ROI including the first subject in the first image. In this case, the size of the first ROI may be set based on the size of the first subject.

In operation S640, the image capturing apparatus 100 may detect a second ROI in the second image based on the difference between the optical characteristics of the first camera module 110 and the optical characteristics of the second camera module 120.

For example, when the angle of view of the lens included in the first camera module 110 is different from the angle of view of the lens included in the second camera module 120, the image capturing apparatus 100 may determine the size of the second ROI based on the difference between the capturing range of the first camera module 110 and the capturing range of the second camera module 120. Since this has already been described above in detail with reference to FIG. 4B, a detailed description thereof will be omitted here.

In addition, when the resolution of the image sensor included in the first camera module 110 is different from the resolution of the image sensor included in the second camera module 120, the image capturing apparatus 100 may determine the number of pixels included in the second ROI based on the difference between the resolution of the first image (the number of pixels included in the first image) and the resolution of the second image (the number of pixels included in the second image).

When the size of the second ROI is determined, the image capturing apparatus 100 may determine the location of the second ROI matching the first ROI by comparing pixel values of the first ROI with pixel values of the second ROI while moving the second ROI within the second image.

In addition, when the second ROI matching the first ROI is detected, the image capturing apparatus 100 may determine a disparity (location difference) between the first ROI and the second ROI. Furthermore, when the disparity between the first ROI and the second ROI is detected, the image capturing apparatus 100 may perform autofocusing of the first camera module 110 and the second camera module 120 based on the detected disparity. Moreover, the image capturing apparatus 100 may detect depth information of at least one of the first ROI and the second ROI based on the detected disparity.

The examples set forth herein may be embodied as program instructions that can be executed by various computing units and recorded on a non-transitory computer-readable recording medium. Examples of the non-transitory computer-readable recording medium may include program instructions, data files, and data structures solely or in combination. The program instructions recorded on the non-transitory computer-readable recording medium may be specifically designed and configured for the disclosure, or may be well known to and usable by one of ordinary skill in the field of computer software. Examples of the non-transitory computer-readable recording medium may include magnetic media (e.g., a hard disk, a floppy disk, a magnetic tape, etc.), optical media (e.g., a compact disc-read-only memory (CD-ROM), a digital versatile disk (DVD), etc.), magneto-optical media (e.g., a floptical disk, etc.), and a hardware device specially configured to store and execute program instructions (e.g., a ROM, a random access memory (RAM), a flash memory, etc.). Examples of the program instructions may include not only machine language codes prepared by a compiler but also high-level codes executable by a computer by using an interpreter.

It should be understood that examples described herein should be considered in a descriptive sense only and not for purposes of limitation. Descriptions of features or aspects within each example should typically be considered as available for other similar features or aspects in other examples.

While one or more examples have been described with reference to the figures, it will be understood by those of ordinary skill in the art that various changes in form and details may be made therein without departing from the spirit and scope as defined by the following claims.

What is claimed is:

1. An image capturing apparatus comprising:
    a first camera and a second camera having different optical characteristics and configured to capture images of a same subject; and
    a controller configured to:
        set a first region of interest (ROI) including the subject in a color first image captured by the first camera, wherein a size of the first ROI is determined according to a size of the subject in the first image,
        determine a size of a second ROI based on a ratio of a size of the subject in a color second image captured by the second camera to the size of the subject in the first image,
        detect the second ROI, having the determined size and matching the first ROI in the second image, based on a difference in optical characteristics of the first camera and optical characteristics of the second camera, and
        adjust focuses of lenses included in the first camera and the second camera based on disparity information of the first ROI and the second ROI,
        wherein a location of the second ROI is determined by comparing pixel values of the first ROI with pixel values of the second ROI while moving the second ROI of the determined size within the second image.

2. The image capturing apparatus of claim 1, wherein the optical characteristics of the first camera are determined based on at least one of: an angle of view of a lens included in the first camera, and a resolution of an image sensor included in the first camera, and the optical characteristics of the second camera are determined based on at least one of: an angle of view of a lens included in the second camera, and a resolution of an image sensor included in the second camera.

3. The image capturing apparatus of claim 2, wherein the ratio is based on a difference in the angle of view of the lens included in the first camera and the angle of view of the lens included in the second camera.

4. The image capturing apparatus of claim 3, wherein, when the angle of view of the lens included in the first camera is wider than the angle of view of the lens included in the second camera, the controller is configured to determine the size of the second ROI to be larger than the size of the first ROI.

5. The image capturing apparatus of claim 2, wherein the controller is configured to determine a number of pixels included in the second ROI based on a number of pixels included in the first ROI and a difference between the resolution of the image sensor included in the first camera and the resolution of the image sensor included in the second camera.

6. The image capturing apparatus of claim 5, wherein, when the resolution of the image sensor included in the first camera is higher than the resolution of the image sensor included in the second camera, the controller is configured to determine the number of the pixels included in the second ROI to be smaller than the number of the pixels included in the first ROI.

7. The image capturing apparatus of claim 1, wherein the controller is configured to detect depth information of one of the first ROI and the second ROI based on disparity information of the first ROI and the second ROI.

8. The image capturing apparatus of claim 1, wherein the controller is further configured to set, as the first ROI, a region of the first image in which a second subject that is not included in the second image is included and, when a region of the first image, in which a second subject that is not included in the second image is included, is set as the first ROI, adjust a focus of a lens included in the first camera using the first ROI including the second subject.

9. A method of operating an image capturing apparatus, comprising:
    acquiring a color first image by capturing a subject by using a first camera;
    acquiring a color second image by capturing the subject by using a second camera, the second camera having different optical characteristics from the first camera;
    setting a first region of interest (ROI) including the subject in the first image, wherein a size of the first ROI is determined according to a size of the subject in the first image;
    determining a size of a second ROI based on a ratio of a size of the subject in the second image to the size of the subject in the first image;
    detecting the second ROI, having the determined size and matching the first ROI, in the second image based on a difference in optical characteristics of the first camera and optical characteristics of the second camera; and
    adjusting focuses of lenses included in the first camera and the second camera based on disparity information of the first ROI and the second ROI,
    wherein a location of the second ROI is determined by comparing pixel values of the first ROI with pixel values of the second ROI while moving the second ROI of the determined size within the second image.

10. The method of claim 9, wherein the optical characteristics of the first camera are determined based on at least one of: an angle of view of a lens included in the first camera, and a resolution of an image sensor included in the first camera, and the optical characteristics of the second camera are determined based on at least one of: an angle of view of a lens included in the second camera, and a resolution of an image sensor included in the second camera.

11. The method of claim 10, wherein the ratio is based on a difference between the angle of view of the lens included in the first camera and the angle of view of the lens included in the second camera.

12. The method of claim 11, wherein, when the angle of view of the lens included in the first camera is wider than the angle of view of the lens included in the second camera, determining the size of the second ROI comprises determining the size of the second ROI to be larger than the size of the first ROI.

13. The method of claim 10, wherein detecting the second ROI comprises determining a number of pixels included in the second ROI based on a number of pixels included in the first ROI and a difference in the resolution of the image sensor included in the first camera and the resolution of the image sensor included in the second camera.

14. The method of claim 13, wherein, when the resolution of the image sensor included in the first camera is higher than the resolution of the image sensor included in the second camera, determining the number of the pixels included in the second ROI comprises determining the number of the pixels included in the second ROI to be smaller than the number of the pixels included in the first ROI.

15. The method of claim 9, further comprising detecting depth information of one of the first ROI and the second ROI based on disparity information of the first ROI and the second ROI.

16. The method of claim 9, further comprising:
setting, as the first ROI, a region of the first image in which a second subject that is not included in the second image is included; and
when a region of the first image, in which a second subject that is not included in the second image is included, is set as the first ROI, adjusting a focus of a lens included in the first camera by using the first ROI including the second subject.

17. A non-transitory computer-readable recording media storing a program that, when executed by a computer, causes the computer to control an imaging capturing apparatus to:
acquire a color first image by capturing a subject by using a first camera;
acquire a color second image by capturing the subject by using a second camera, the second camera having different optical characteristics from the first camera;
set a first region of interest (ROI) including the subject in the first image, wherein a size of the first ROI is determined according to a size of the subject in the first image;
determine a size of a second ROI based on a ratio of a size of the subject in the second image to the size of the subject in the first image;
detect the second ROI, having the determined size and matching the first ROI, in the second image based on a difference in optical characteristics of the first camera and optical characteristics of the second camera; and
adjust focuses of lenses included in the first camera and the second camera based on disparity information of the first ROI and the second ROI,
wherein a location of the second ROI is determined by comparing pixel values of the first ROI with pixel values of the second ROI while moving the second ROI of the determined size within the second image.

* * * * *